(12) United States Patent
Yonezawa et al.

(10) Patent No.: US 9,746,667 B2
(45) Date of Patent: *Aug. 29, 2017

(54) ZOOM LENS AND IMAGING APPARATUS

(71) Applicant: FUJIFILM Corporation, Tokyo (JP)

(72) Inventors: Masaru Yonezawa, Saitama (JP); Nobuaki Toyama, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/069,050

(22) Filed: Mar. 14, 2016

(65) Prior Publication Data

US 2016/0274341 A1    Sep. 22, 2016

(30) Foreign Application Priority Data

Mar. 17, 2015 (JP) ................................. 2015-053564

(51) Int. Cl.
    G02B 15/14    (2006.01)
    G02B 27/00    (2006.01)
    G02B 15/17    (2006.01)

(52) U.S. Cl.
    CPC ......... G02B 27/0025 (2013.01); G02B 15/17 (2013.01)

(58) Field of Classification Search
    CPC ... G02B 27/0025; G02B 15/17; G02B 15/163
    USPC .......... 359/682, 684, 695, 698, 714, 71, 683
    See application file for complete search history.

(56) References Cited

U.S. PATENT DOCUMENTS

| 2012/0002300 A1 | 1/2012 | Kodaira |
| 2012/0134031 A1 | 5/2012 | Eguchi et al. |
| 2015/0015969 A1* | 1/2015 | Komatsu ................ G02B 15/17 359/683 |

FOREIGN PATENT DOCUMENTS

| JP | 2012013817 A | 1/2012 |
| JP | 2014016508 A | 1/2014 |
| JP | 5615143 B2 | 10/2014 |

* cited by examiner

*Primary Examiner* — Alicia M Harrington
(74) *Attorney, Agent, or Firm* — Studebaker & Brackett PC

(57) ABSTRACT

A zoom lens consists of, in order from the object side, a positive first lens group that is fixed during magnification change, at least three movable lens groups that are moved during magnification change, and a positive end lens group that is disposed at the most image side and is fixed during magnification change. The at least three movable lens groups include, in order from the object side, a positive lens group, a negative lens group, and a negative lens group. The first lens group includes at least two negative lenses, where the most object-side negative lens has a meniscus shape with the convex surface toward the object side, and a first-n lens, which is at least one negative lens of the rest of the negative lenses of the first lens group, satisfies given condition expressions (1) and (2).

20 Claims, 9 Drawing Sheets

FIG.4 EXAMPLE 4

FIG.5
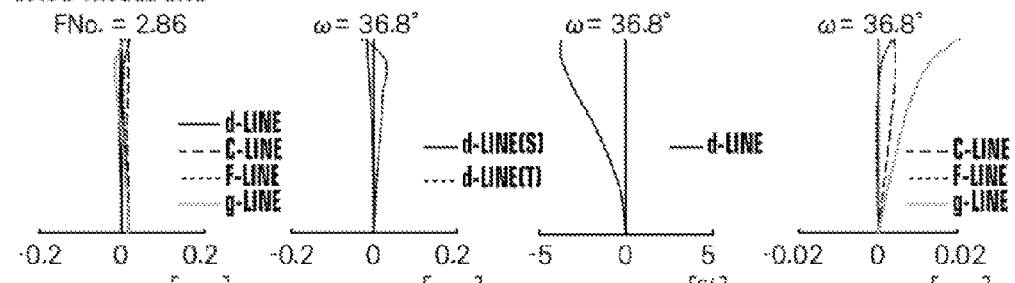
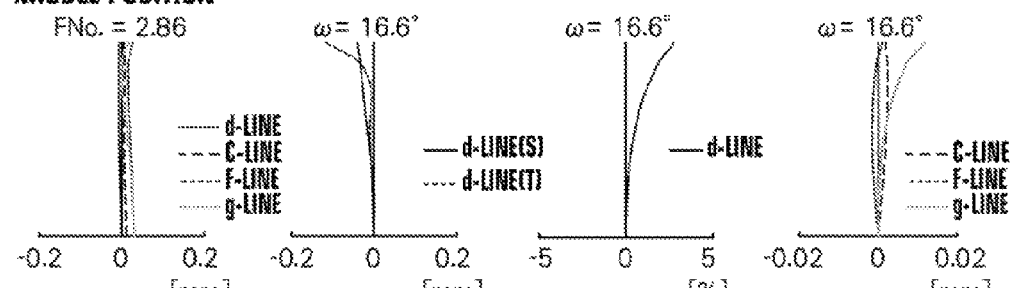
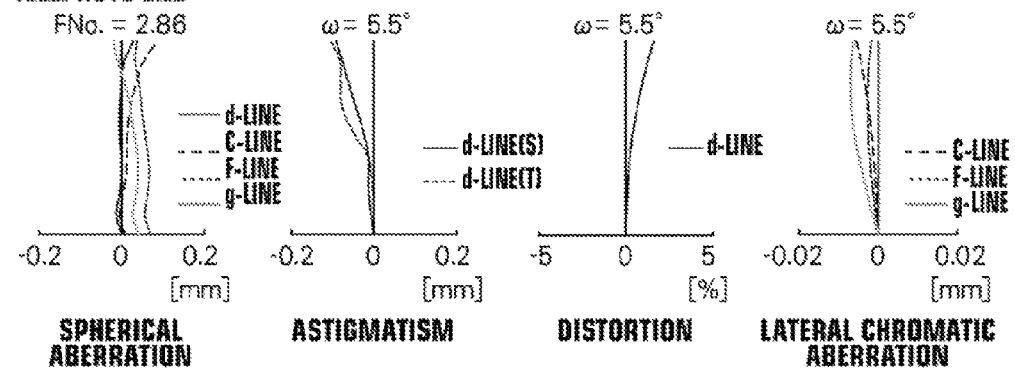

FIG.7
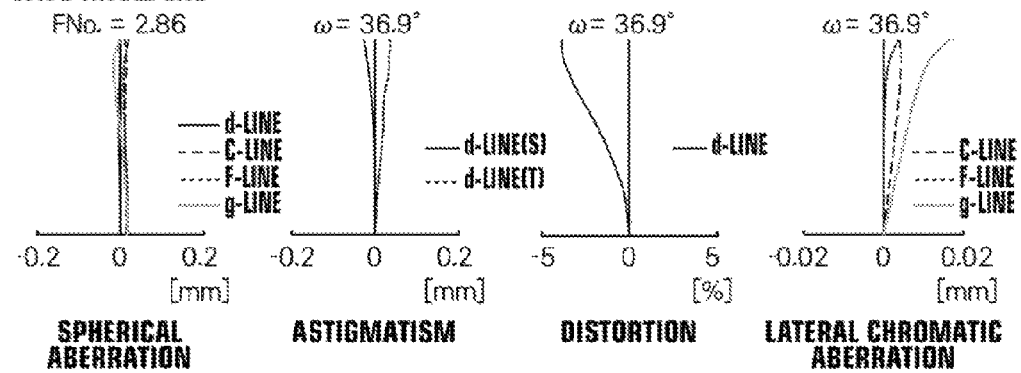
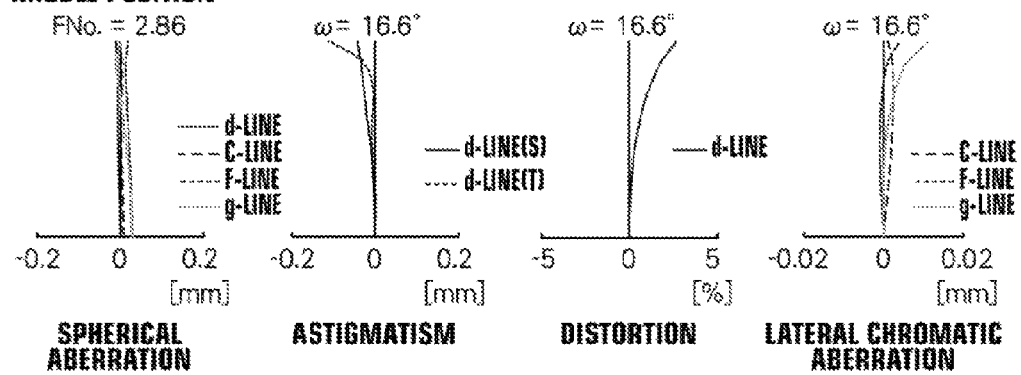
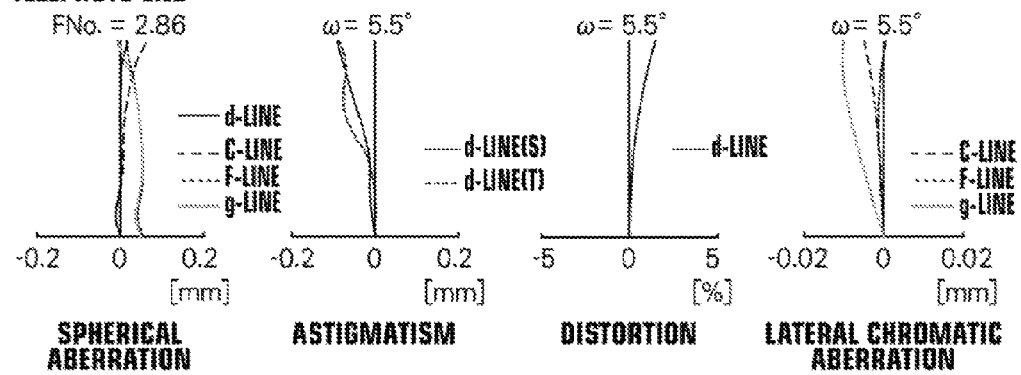

ZOOM LENS AND IMAGING APPARATUS

CROSS-REFERENCE TO RELATED APPLICATIONS

The present application claims priority under 35 U.S.C. §119 to Japanese Patent Application No. 2015-053564, filed on Mar. 17, 2015. The above application is hereby expressly incorporated by reference, in its entirety, into the present application.

BACKGROUND

The present disclosure relates to a zoom lens for use with electronic cameras, such as digital cameras, video cameras, broadcasting cameras, monitoring cameras, etc., and an imaging apparatus provided with the zoom lens.

For broadcasting cameras and motion picture cameras, change of the angle of view due to focusing is undesirable, and such cameras often employ a focusing system where the first lens group of the zoom lens is divided into a first-a lens group that has a negative refractive power and is fixed during focusing, a first-b lens group that has a positive refractive power, and a first-c lens group that has a positive refractive power, and the first-b lens group is moved to effect focusing. Zoom lenses having the above-described focusing system are proposed in Japanese Patent No. 5615143, and Japanese Unexamined Patent Publication Nos. 2012-013817 and 2014-016508 (hereinafter, Patent Documents 1 to 3, respectively).

SUMMARY

The lenses of Patent Documents 1 to 3, however, have a problem that the size of the first lens group is extremely large relative to the image size. Further, the entire length of the lens of Patent Document 1 is large, and, in order to reduce the entire length, it is necessary to increase the power of the first lens group, which will accompany a problem of insufficient chromatic aberration correction. Also, all the lenses of Patent Documents 2 and 3 have insufficient chromatic aberration correction. In recent years, there is an increasing demand for portable broadcasting lenses, and high performance lenses that are compact relative to large image sizes and have successfully corrected chromatic aberration are demanded.

In view of the above-described circumstances, the present disclosure is directed to providing a compact and high performance zoom lens with successfully corrected chromatic aberration, and an imaging apparatus provided with the zoom lens.

The zoom lens of the disclosure consists of, in order from the object side, a first lens group that has a positive refractive power and is fixed during magnification change, at least three movable lens groups that are moved during magnification change with changing the distances along the optical axis direction between adjacent groups, and an end lens group that has a positive refractive power, is disposed at the most image side, and is fixed during magnification change, wherein the at least three movable lens groups include, in order from the object side, a lens group having a positive refractive power, a lens group having a negative refractive power, and a lens group having a negative refractive power, the first lens group includes at least two negative lenses, wherein the most object-side negative lens has a meniscus shape with the convex surface toward the object side, and a first-n lens, which is at least one negative lens of the rest of the negative lenses of the first lens group, satisfies the condition expressions (1) and (2) below:

$$62 < vdn \tag{1, and}$$

$$0.64 < \theta gFn + 0.001625 \times vdn < 0.7 \tag{2},$$

where vdn is an Abbe number with respect to the d-line of the first-n lens, and $\theta gFn$ is a partial dispersion ratio of the first-n lens.

The recitation "the at least three movable lens groups include, in order from the object side, a lens group having a positive refractive power, a lens group having a negative refractive power, and a lens group having a negative refractive power, . . . " herein encompasses not only an aspect where the other lens groups are disposed on the image side of the three successive movable lens groups, i.e., the lens group having a positive refractive power, the lens group having a negative refractive power, and the lens group having a negative refractive power, but also aspects where any other lens group is disposed on the object side of or between the three movable lens groups.

It is preferred that any one or all of the condition expressions (1-1), (1-2), and (2-1) below be satisfied:

$$70 < vdn \tag{1-1},$$

$$70 < vdn < 100 \tag{1-2},$$

$$0.65 < \theta gFn + 0.001625 \times vdn < 0.69 \tag{2-1}.$$

In the zoom lens of the disclosure, it is preferred that the first-a lens group include a cemented lens formed by, in order from the object side, the first-n lens and a first-p lens having a positive refractive power that are cemented together, and satisfy the condition expressions (3) and (4) below. It is more preferred that the condition expression (3-1) and/or (4-1) below be satisfied.

$$vdp < 40 \tag{3},$$

$$20 < vdp < 38 \tag{3-1},$$

$$0.62 < \theta gFp + 0.001625 \times vdp < 0.67 \tag{4},$$

$$0.63 < \theta gFp + 0.001625 \times vdp < 0.66 \tag{4-1},$$

where vdp is an Abbe number with respect to the d-line of the first-p lens, and $\theta gFp$ is a partial dispersion ratio of the first-p lens.

It is preferred that the first lens group consist of, in order from the object side, a first-a lens group that has a negative refractive power and is fixed during focusing, a first-b lens group that has a positive refractive power and is moved during focusing with changing the distances along the optical axis direction between adjacent groups, and a first-c lens group that has a positive refractive power, and the first-n lens be included in the first-a lens group.

In this case, it is preferred that the condition expression (5) below be satisfied, and it is more preferred that the condition expression (5-1) below be satisfied:

$$1 < fln/fla < 2 \tag{5},$$

$$1.1 < fln/fla < 1.8 \tag{5-1},$$

where fln is a focal length with respect to the d-line of the first-n lens, and fla is a focal length with respect to the d-line of the first-a lens group.

It is preferred that the first-a lens group consist of, in order from the object side, two negative lenses, and a cemented lens formed by, in order from the object side, the first-n lens and a first-p lens having a positive refractive power that are cemented together.

The first-c lens group may be fixed during focusing, or may be moved during focusing along a different locus of movement from that of the first-b lens group.

In the zoom lens of the disclosure, it is preferred that the condition expression (6) below be satisfied, and it is more preferred that the condition expression (6-1) below be satisfied:

$$1.2 < ft/fl < 2 \quad (6),$$

$$1.3 < ft/fl < 1.8 \quad (6\text{-}1),$$

where ft is a focal length of the entire system at the telephoto end, and fl is a focal length of the first lens group.

It is preferred that the condition expression (7) below be satisfied, and it is more preferred that the condition expression (7-1) below be satisfied:

$$fw/fp < 0.15 \quad (7),$$

$$0.02 < fw/fp < 0.1 \quad (7\text{-}1),$$

where fw is a focal length of the entire system at the wide angle end, and fp is a focal length of the most object-side movable lens group having a positive refractive power of the movable lens groups.

The movable lens groups of the zoom lens may consist of, in order from the object side, a second lens group having a positive refractive power, a third lens group having a negative refractive power, and a fourth lens group having a negative refractive power, or may consist of, in order from the object side, a second lens group having a positive refractive power, a third lens group having a negative refractive power, a fourth lens group having a negative refractive power, and a fifth lens group having a positive refractive power.

The imaging apparatus of the disclosure comprises the above-described zoom lens of the disclosure.

It should be noted that the expression "consisting/consist of" as used herein means that the zoom lens may include, besides the elements recited above: lenses substantially without any power; optical elements other than lenses, such as a stop, a mask, a cover glass, and filters; and mechanical components, such as a lens flange, a lens barrel, an image sensor, a camera shake correction mechanism, etc.

The sign (positive or negative) with respect to the surface shape and the refractive power of any lens including an aspheric surface among the lenses described above is about the paraxial region.

The zoom lens of the disclosure consists of, in order from the object side, a first lens group that has a positive refractive power and is fixed during magnification change, at least three movable lens groups that are moved during magnification change with changing the distances along the optical axis direction between adjacent lens groups, and an end lens group that has a positive refractive power, is disposed at the most image side, and is fixed during magnification change, wherein the at least three movable lens groups include, in order from the object side, a lens group having a positive refractive power, a lens group having a negative refractive power, and a lens group having a negative refractive power, the first lens group includes at least two negative lenses, wherein the most object-side negative lens has a meniscus shape with the convex surface toward the object side, and a first-n lens, which is at least one negative lens of the rest of the negative lenses of the first lens group, satisfies the condition expressions (1) and (2) below:

$$62 < vdn \quad (1), \text{ and}$$

$$0.64 < \theta gFn + 0.001625 \times vdn < 0.7 \quad (2).$$

This configuration allows providing a compact and high performance zoom lens with successfully corrected chromatic aberration.

The imaging apparatus of the disclosure, which is provided with the zoom lens of the disclosure, allows size reduction of the apparatus, and allows obtaining high image-quality images.

BRIEF DESCRIPTION OF THE DRAWINGS

FIG. 5 shows aberration diagrams of the zoom lens of Example 1 of the disclosure, FIG. 7 shows aberration diagrams of the zoom lens of Example 3 of the disclosure.

DETAILED DESCRIPTION OF THE PREFERRED EMBODIMENTS

Figure 1:
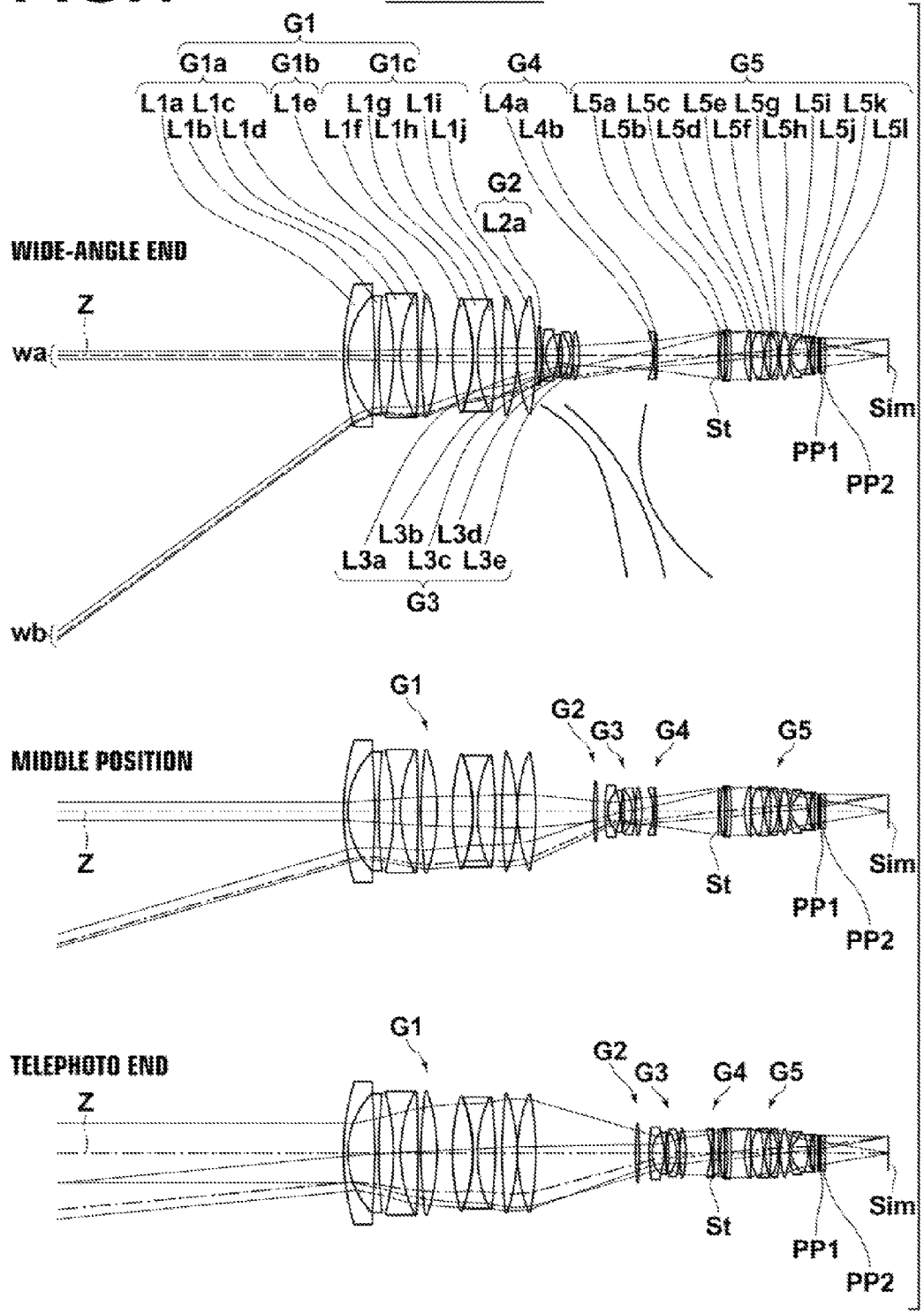
FIG. 1 is a sectional view illustrating the lens configuration of a zoom lens according to one embodiment of the disclosure (a zoom lens of Example 1)

Hereinafter, embodiments of the present disclosure will be described in detail with reference to the drawings. FIG. 1 is a sectional view illustrating the lens configuration of a zoom lens according to one embodiment of the disclosure. The configuration example shown in FIG. 1 is the same as the configuration of a zoom lens of Example 1, which will be described later. In FIG. 1, the left side is the object side and the right side is the image plane side. An aperture stop St shown in the drawing does not necessarily represent the size and the shape thereof, but represents the position thereof along the optical axis Z. FIG. 1 also shows loci of movement of lens groups during magnification change, an axial bundle of rays wa, and a bundle of rays wb at the maximum angle of view.

The zoom lens of this embodiment consists of, in order from the object side, a first lens group G1 that has a positive refractive power and is fixed during magnification change, at least three movable lens groups that are moved during magnification change with changing the distances along the optical axis direction between adjacent lens groups, and an end lens group that has a positive refractive power, is disposed at the most image side, and is fixed during magnification change. In the example shown in FIG. 1, the zoom lens consists of the first lens group G1 that has a positive refractive power and is fixed during magnification change, second to fourth lens groups G2 to G4 (movable lens groups) that are moved during magnification change with changing the distances along the optical axis direction between adjacent lens groups, and a fifth lens group G5 (end lens group) that has a positive refractive power, is disposed at the most image side, and is fixed during magnification change. The first lens group G1 consists of ten lenses L1a to L1j, the second lens group G2 consists of a lens L2a, the third lens group G3 consists of five lenses L3a to L3e, the fourth lens group G4 consists of two lenses L4a and L4b, and the fifth lens group G5 consists of twelve lenses L5a to L5l.

When this zoom lens is used with an imaging apparatus, it is preferred to provide a cover glass, a prism, and various filters, such as an infrared cutoff filter and a low-pass filter, between the optical system and the image plane Sim depending on the configuration of the camera on which the lens is mounted. In the example shown in FIG. 1, optical members PP1 and PP2 in the form of plane-parallel plates, which are assumed to represent the above-mentioned elements, are disposed between the lens system and the image plane Sim.

Providing the most object-side lens group with a positive refractive power in this manner allows reducing the entire length of the lens system, and this is advantageous for size reduction. Further, providing the most image-side lens group with a positive refractive power allows minimizing increase of the incidence angle of the principal ray of off-axis rays entering the image plane Sim, and this allows suppressing shading. Further, since the most object-side lens group and the most image-side lens group are fixed during magnification change, the entire length of the lens system does not change during magnification change, and this allows providing a zoom lens with small change of center of gravity during magnification change, and thus with good operability.

The at least three movable lens groups include, in order from the object side, a lens group having a positive refractive power, a lens group having a negative refractive power, and a lens group having a negative refractive power. In general, when there are two movable lens groups having a negative refractive power, the amount of movement of the movable lens groups can be made smaller than that when there is one movable lens group having a negative refractive power. This configuration therefore leads to reduction of the entire length of the lens system. Further, including the movable lens group having a positive refractive power allows reducing the image height, and this allows reducing the effective diameter of the first lens group G1 at the telephoto side. These features allow size reduction and weight reduction of the entire zoom lens.

The first lens group G1 includes at least two negative lenses, where the most object-side negative lens has a meniscus shape with the convex surface toward the object side, and a first-n lens, which is at least one negative lens of the rest of the negative lenses of the first lens group, satisfies the condition expressions (1) and (2) below. It should be noted that, in this embodiment, the lens L1c corresponds to the first-n lens.

Disposing at least two negative lenses in the first lens group G1 in this manner allows providing a negative refractive power necessary for achieving a wide angle of view. Providing the most object-side negative lens of the first lens group G1 with a meniscus shape with the convex surface toward the object side allows suppressing astigmatism and distortion. Further, providing the first-n lens that satisfies the condition expressions (1) and (2) below in the first lens group G1 allows successfully correcting chromatic aberration at the first lens group G1, in particular, successfully correcting lateral chromatic aberration at the wide angle side and longitudinal chromatic aberration at the telephoto side.

Satisfying the condition expression (1) allows successfully correcting lateral chromatic aberration at the wide angle side and longitudinal chromatic aberration at the telephoto side during focusing. Further, satisfying the condition expression (2) together with the condition expression (1) allows successfully correcting secondary spectrum.

$$62 < \nu dn \qquad (1), \text{ and}$$

$$0.64 < \theta gFn + 0.001625 \times \nu dn < 0.7 \qquad (2),$$

where $\nu dn$ is an Abbe number with respect to the d-line of the first-n lens, and $\theta gFn$ is a partial dispersion ratio of the first-n lens.

It should be noted that higher performance can be obtained when any one or all of the condition expressions (1-1), (1-2), and (2-1) below are satisfied. Setting the value of $\nu dn$ such that it does not become equal to or greater than the upper limit of the condition expression (1-2) allows preventing the material forming the first-n lens from having excessively low dispersion, and this allows selecting a material having sufficient refractive index for successfully correcting distortion at the wide angle end.

$$70 < \nu dn \qquad (1-1)$$

$$70 < \nu dn < 100 \qquad (1-2)$$

$$0.65 < \theta gFn + 0.001625 \times \nu dn < 0.69 \qquad (2-1)$$

In the zoom lens of this embodiment, it is preferred that the first lens group G1 include a cemented lens formed by, in order from the object side, the first-n lens and a first-p lens having a positive refractive power that are cemented together, and satisfy the condition expressions (3) and (4) below. In this embodiment, the lens L1c corresponds to the first-n lens, and the lens L1d corresponds to the first-p lens. Disposing the above-described cemented lens in the first lens group G1 allows successfully correcting chromatic aberration at the first lens group G1, and suppressing change of longitudinal chromatic aberration and lateral chromatic aberration during focusing. Further, satisfying the condition expression (3) allows successfully correcting lateral chromatic aberration at the wide angle side and longitudinal chromatic aberration at the telephoto side during focusing. Satisfying the condition expression (4) together with the condition expression (3) allows successfully correcting secondary spectrum. It should be noted that higher performance can be obtained when the condition expression (3-1) and/or (4-1) below is satisfied.

$$\nu dp < 40 \qquad (3),$$

$$20 < \nu dp < 38 \qquad (3-1),$$

$$0.62 < \theta gFp + 0.001625 \times \nu dp < 0.67 \qquad (4),$$

$$0.63 < \theta gFp + 0.001625 \times \nu dp < 0.66 \qquad (4-1),$$

where $\nu dp$ is an Abbe number with respect to the d-line of the first-p lens, and $\theta gFp$ is a partial dispersion ratio of the first-p lens.

Further, it is preferred that the first lens group G1 consist of, in order from the object side, a first-a lens group G1a that has a negative refractive power and is fixed during focusing, a first-b lens group G1b that has a positive refractive power and is moved during focusing with changing the distances along the optical axis direction between adjacent groups, and a first-c lens group G1c that has a positive refractive power, and the first-n lens be included in the first-a lens group G1a. In this embodiment, the first-a lens group G1a consists of four lenses L1a to lens L1d, the first-b lens group G1b consists of a lens L1e, and the first-c lens group G1c consists of five lenses L1f to L1j. This configuration allows suppressing change of the angle of view during focusing, and successfully correcting chromatic aberration during focusing.

In this case, it is preferred that the condition expression (5) below be satisfied. Satisfying the condition expression (5) allows successfully correcting chromatic aberration, in particular, secondary spectrum of longitudinal chromatic aberration at the telephoto side. It should be noted that higher performance can be obtained when the condition expression (5-1) below is satisfied.

$$1<f1n/f1a<2 \qquad (5),$$

$$1.1<f1n/f1a<1.8 \qquad (5\text{-}1),$$

where f1n is a focal length with respect to the d-line of the first-n lens, and f1a is a focal length with respect to the d-line of the first-a lens group.

It is preferred that the first-a lens group G1a consist of, in order from the object side, two negative lenses, and a cemented lens formed by, in order from the object side, the first-n lens and the first-p lens having a positive refractive power that are cemented together. This configuration allows suppressing field curvature and distortion at the wide angle side, and successfully correcting spherical aberration at the telephoto side.

The first-c lens group G1c may be fixed during focusing. In this case, the first-b lens group G1b is the only movable group during focusing, and this allows weight reduction of the movable group that is moved during focusing.

The first-c lens group G1c may be moved during focusing along a different locus of movement from that of the first-b lens group G1b. This configuration facilitates suppressing change of aberrations during focusing, in particular, facilitates suppressing field curvature and distortion at the wide angle side, and spherical aberration at the telephoto side.

In the zoom lens of this embodiment, it is preferred that the condition expression (6) below be satisfied. Setting the value of ft/f1 such that it does not become equal to or smaller than the lower limit of the condition expression (6) allows preventing the power of the first lens group G1 from becoming excessively weak, and this prevents increase of the entire length, thereby contributing to size reduction. Setting the value of ft/f1 such that it does not become equal to or greater than the upper limit of the condition expression (6) allows preventing the power of the first lens group G1 from becoming excessively strong, and this allows successfully correcting chromatic aberration. It should be noted that higher performance can be obtained when the condition expression (6-1) below is satisfied.

$$1.2<ft/f1<2 \qquad (6),$$

$$1.3<ft/f1<1.8 \qquad (6\text{-}1),$$

where ft is a focal length of the entire system at the telephoto end, and f1 is a focal length of the first lens group.

It is preferred that the condition expression (7) below be satisfied. Satisfying the condition expression (7) allows reducing the effective diameter of the first lens group G1 at the telephoto side, thereby allowing size reduction and weight reduction. Setting the value of fw/fp such that it does not become equal to or smaller than the lower limit of the condition expression (7) allows preventing the power of the most object-side movable lens group having a positive refractive power of the movable lens groups from becoming excessively weak, and this allows preventing size increase of the first lens group G1. Setting the value of fw/fp such that it does not become equal to or greater than the upper limit of the condition expression (7) allows preventing the power of the most object-side movable lens group having a positive refractive power of the movable lens groups from becoming excessively strong, and this allows preventing increase of change of spherical aberration during magnification change. It should be noted that higher performance can be obtained when the condition expression (7-1) below is satisfied.

$$fw/fp<0.15 \qquad (7),$$

$$0.02<fw/fp<0.1 \qquad (7\text{-}1),$$

where fw is a focal length of the entire system at the wide angle end, and fp is a focal length of the most object-side movable lens group having a positive refractive power of the movable lens groups.

The movable lens groups of the zoom lens may consist of, in order from the object side, the second lens group G2 having a positive refractive power, the third lens group G3 having a negative refractive power, and the fourth lens group G4 having a negative refractive power. This configuration facilitates correction of aberrations during magnification change, in particular, facilitates suppressing change of spherical aberration, field curvature, and distortion. It should be noted that the zoom lens of this embodiment shows this aspect.

Alternatively, the movable lens groups of the zoom lens may consist of, in order from the object side, the second lens group having a positive refractive power, the third lens group having a negative refractive power, the fourth lens group having a negative refractive power, and the fifth lens group having a positive refractive power. This configuration allows more appropriate aberration correction than the above-described configuration where the movable lens groups consists of three lens groups.

In the example shown in FIG. 1, the optical members PP1 and PP2 are disposed between the lens system and the image plane Sim. However, in place of disposing the various filters, such as a low-pass filter and a filter that cuts off a specific wavelength range, between the lens system and the image plane Sim, the various filters may be disposed between the lenses, or coatings having the same functions as the various filters may be applied to the lens surfaces of some of the lenses.

Next, numerical examples of the zoom lens of the disclosure are described.

First, a zoom lens of Example 1 is described. FIG. 1 is a sectional view illustrating the lens configuration of the zoom lens of Example 1. It should be noted that, in FIG. 1, and FIGS. 2 to 4 corresponding to Examples 2 to 4, which will be described later, the left side is the object side and the right side is the image plane side. The aperture stop St shown in the drawings does not necessarily represent the size and the shape thereof, but represents the position thereof along the optical axis Z. FIG. 1 also shows loci of movement of the lens groups during magnification change, an axial bundle of rays wa, and a bundle of rays wb at the maximum angle of view.

The zoom lens of Example 1 consists of, in order from the object side, a first lens group G1 that has a positive refractive power and is fixed during magnification change, second to fourth lens groups G2 to G4 (movable lens groups) that are moved during magnification change with changing the distances along the optical axis direction between adjacent lens groups, and a fifth lens group G5 (end lens group) that has a positive refractive power, is disposed at the most image side, and is fixed during magnification change.

Table 1 shows basic lens data of the zoom lens of Example 1, Table 2 shows data about specifications of the zoom lens, Table 3 shows data about variable surface distances of the zoom lens, and Table 4 shows data about aspheric coefficients of the zoom lens. In the following description, meanings of symbols used in the tables are explained with respect to Example 1 as an example. The same explanations basically apply to those with respect to Examples 2 to 4.

In the lens data shown in Table 1, each value in the column of "Surface No." represents a surface number, where the object-side surface of the most object-side element is the 1st surface and the number is sequentially increased toward the image plane side, each value in the column of "Radius of Curvature" represents the radius of curvature of the corresponding surface, and each value in the column of "Surface Distance" represents the distance along the optical axis Z between the corresponding surface and the next surface. Each value in the column of "nd" represents the refractive index with respect to the d-line (the wavelength of 587.6 nm) of the corresponding optical element, each value in the column of "vd" represents the Abbe number with respect to the d-line (the wavelength of 587.6 nm) of the corresponding optical element, and each value in the column of "θgF" represents the partial dispersion ratio of the corresponding optical element.

It should be noted that the partial dispersion ratio θgF is expressed by the formula below:

$$\theta gF = (Ng - NF)/(NF - NC),$$

where Ng is a refractive index with respect to the g-line, NF is a refractive index with respect to F-line, and NC is a refractive index with respect to the C-line.

The sign with respect to the radius of curvature is provided such that a positive radius of curvature indicates a surface shape that is convex toward the object side, and a negative radius of curvature indicates a surface shape that is convex toward the image plane side. The basic lens data also includes data about the aperture stop St and the optical members PP1 and PP2, and the surface number and the text "(stop)" are shown at the position in the column of the surface number corresponding to the aperture stop St. In the lens data shown in Table 1, each surface distance that is variable during magnification change is represented by the symbol "DD[surface number]". The numerical value corresponding to each DD[surface number] is shown in Table 3.

The data about specifications shown in Table 2 show values of zoom magnification, focal length f, F-number FNo., and full angle of view 2ω.

With respect to the basic lens data, the data about specifications, and the data about variable surface distances, the unit of angle is degrees, and the unit of length is millimeters; however, any other suitable units may be used since optical systems are usable when they are proportionally enlarged or reduced.

In the lens data shown in Table 1, the symbol "*" is added to the surface number of each aspheric surface, and the numerical value of the paraxial radius of curvature is shown as the radius of curvature of each aspheric surface. In the data about aspheric coefficients shown in Table 4, the surface number of each aspheric surface and aspheric coefficients about each aspheric surface are shown. The aspheric coefficients are values of the coefficients KA and Am (where m=3, . . . , 20) in the formula of aspheric surface shown below:

$$Zd = C \cdot h^2 / \{1 + (1 - KA \cdot C^2 \cdot h^2)^{1/2}\} + \Sigma Am \cdot h^m,$$

where Zd is a depth of the aspheric surface (a length of a perpendicular line from a point with a height h on the aspheric surface to a plane tangent to the apex of the aspheric surface and perpendicular to the optical axis), h is the height (a distance from the optical axis), C is a reciprocal of the paraxial radius of curvature, and KA and Am are aspheric coefficients (where m=3, . . . , 20).

TABLE 1

Example 1 - Lens Data

| Surface No. | Radius of Curvature | Surface Distance | nd | vd | θgF |
|---|---|---|---|---|---|
| 1 | 214.0485 | 3.6001 | 1.88300 | 40.76 | 0.56679 |
| 2 | 75.1630 | 22.9827 | | | |
| 3 | −597.4831 | 3.3000 | 1.73400 | 51.47 | 0.54874 |
| 4 | 443.5473 | 12.9081 | | | |
| 5 | −187.4186 | 5.8583 | 1.53775 | 74.70 | 0.53936 |
| 6 | 122.1466 | 14.7216 | 1.91650 | 31.60 | 0.59117 |
| 7 | −1192.6629 | 2.6958 | | | |
| *8 | 337.3004 | 13.7943 | 1.43875 | 94.94 | 0.53433 |
| 9 | −172.5134 | 13.4076 | | | |
| 10 | 192.0693 | 17.0129 | 1.49700 | 81.54 | 0.53748 |
| 11 | −139.9406 | 0.6538 | | | |
| 12 | −133.1303 | 3.3500 | 1.85150 | 40.78 | 0.56958 |
| 13 | 115.2733 | 15.2541 | 1.49700 | 81.54 | 0.53748 |
| 14 | −398.0807 | 6.0395 | | | |
| 15 | 459.0857 | 12.9020 | 1.53775 | 74.70 | 0.53936 |
| 16 | −156.6756 | 0.2000 | | | |
| 17 | 137.1994 | 15.6658 | 1.49700 | 81.54 | 0.53748 |
| 18 | −276.3776 | DW[18] | | | |
| 19 | 362.4361 | 2.9957 | 1.49700 | 81.54 | 0.53748 |
| 20 | −555.5230 | DD[20] | | | |
| *21 | 212.6957 | 2.4011 | 1.53775 | 74.70 | 0.53936 |
| 22 | 27.2627 | 10.4426 | | | |
| 23 | −42.9639 | 1.2004 | 2.00100 | 29.13 | 0.59952 |
| 24 | 191.3068 | 2.4309 | | | |
| 25 | −105.3359 | 6.7325 | 1.69895 | 30.13 | 0.60298 |
| 26 | −28.8119 | 2.4783 | 1.69560 | 59.05 | 0.54348 |
| 27 | −82.6623 | 0.3007 | | | |
| 28 | 161.3383 | 5.2491 | 1.83481 | 42.72 | 0.56486 |
| 29 | −80.5118 | DD[29] | | | |
| 30 | −52.0619 | 1.3100 | 1.49700 | 81.54 | 0.53748 |
| 31 | 1116.7924 | 1.9941 | 1.84666 | 23.83 | 0.61603 |
| 32 | −307.6714 | DD[32] | | | |
| 33 (stop) | ∞ | 1.8275 | | | |
| 34 | 118.3571 | 3.8140 | 1.91082 | 35.25 | 0.58224 |
| 35 | −350.3523 | 2.5727 | | | |
| 36 | −105.5123 | 3.0000 | 1.76182 | 26.52 | 0.61361 |
| 37 | −208.3315 | 11.3437 | | | |
| 38 | 59.9113 | 5.2848 | 1.65844 | 50.88 | 0.55612 |
| 39 | ∞ | 0.3009 | | | |
| 40 | 42.0799 | 10.3271 | 1.43875 | 94.94 | 0.53433 |
| 41 | −78.3277 | 1.5500 | 1.95375 | 32.32 | 0.59015 |
| 42 | 56.6019 | 4.9263 | | | |
| 43 | −226.8790 | 6.1786 | 1.80518 | 25.43 | 0.61027 |
| 44 | −36.3203 | 1.4100 | 1.80400 | 46.58 | 0.55730 |
| 45 | −106.9554 | 0.4084 | | | |
| 46 | 64.4975 | 7.8638 | 1.48749 | 70.24 | 0.53007 |
| 47 | −64.4975 | 0.2001 | | | |
| 48 | 54.5207 | 2.0998 | 1.91082 | 35.25 | 0.58224 |
| 49 | 20.5114 | 13.6195 | 1.49700 | 81.54 | 0.53748 |
| 50 | −42.0493 | 1.6000 | 1.90043 | 37.37 | 0.57720 |
| 51 | 57.4339 | 0.6085 | | | |
| 52 | 48.2644 | 3.3704 | 1.84666 | 23.83 | 0.61603 |
| 53 | 240.7851 | 3.0000 | | | |
| 54 | ∞ | 1.4000 | 1.51633 | 64.14 | 0.53531 |
| 55 | ∞ | 1.0000 | | | |
| 56 | ∞ | 3.6900 | 1.51633 | 64.14 | 0.53531 |
| 57 | ∞ | 54.0311 | | | |

TABLE 2

Example 1 - Specifications (d-line)

|  | Wide Angle End | Middle | Telephoto End |
|---|---|---|---|
| Zoom Magnification | 1.0 | 2.4 | 7.4 |
| f | 19.91 | 46.80 | 146.33 |
| FNo. | 2.86 | 2.86 | 2.86 |
| 2ω [°] | 73.6 | 33.2 | 11.0 |

TABLE 3

Example 1 - Distances with respect to Zoom

|  | Wide Angle End | Middle | Telephoto End |
|---|---|---|---|
| DD [18] | 1.4993 | 49.5135 | 85.3829 |
| DD [20] | 1.4865 | 6.8361 | 8.7457 |
| DD [29] | 62.9756 | 9.2695 | 21.2659 |
| DD [32] | 52.4033 | 52.7456 | 2.9702 |

TABLE 4

Example 1 - Aspheric Coefficients

| Surface No. 8 | |
|---|---|
| KA | 1.0000000E+00 |
| A3 | 1.5064530E−07 |
| A4 | −1.5641141E−07 |
| A5 | 1.6501598E−09 |
| A6 | −3.9701428E−11 |
| A7 | 6.9263338E−13 |
| A8 | 1.0556630E−17 |
| A9 | −7.0509369E−17 |
| A10 | 5.3287613E−19 |

| Surface No. 21 | |
|---|---|
| KA | 1.0000000E+00 |
| A4 | 1.5045420E−06 |
| A6 | −4.1679388E−10 |
| A8 | −8.9800509E−12 |
| A10 | 7.0993908E−14 |
| A12 | −3.2299521E−16 |
| A14 | 8.7823289E−19 |
| A16 | −1.4036759E−21 |
| A18 | 1.2097861E−24 |
| A20 | −4.3023907E−28 |

FIG. 5 shows aberration diagrams of the zoom lens of Example 1. The aberration diagrams shown at the top of FIG. 5 are those of spherical aberration, astigmatism, distortion, and lateral chromatic aberration, in this order from the left side, at the wide-angle end. The aberration diagrams shown at the middle of FIG. 5 are those of spherical aberration, astigmatism, distortion, and lateral chromatic aberration, in this order from the left side, at the middle position. The aberration diagrams shown at the bottom of FIG. 5 are those of spherical aberration, distortion, and lateral chromatic aberration, in this order from the left side, at the telephoto end. These aberration diagrams show aberrations when the object distance is infinity. The aberration diagrams of spherical aberration, astigmatism, and distortion show those with respect to the d-line (the wavelength of 587.6 nm), which is used as a reference wavelength. The aberration diagrams of spherical aberration show those with respect to the d-line (the wavelength of 587.6 nm), the C-line (the wavelength of 656.3 nm), the F-line (the wavelength of 486.1 nm), and the g-line (the wavelength of 435.8 nm) in the solid line, the long dashed line, the short dashed line, and the gray solid line, respectively. The aberration diagrams of astigmatism show those in the sagittal direction and the tangential direction in the solid line, and the short dashed line, respectively. The aberration diagrams of lateral chromatic aberration show those with respect to the C-line (the wavelength of 656.3 nm), the F-line (the wavelength of 486.1 nm), and the g-line (the wavelength of 435.8 nm) in the long dashed line, the short dashed line, and the gray solid line, respectively. The symbol "FNo." in the aberration diagrams of spherical aberration means "F-number", and the symbol "ω" in the other aberration diagrams means "half angle of view".

Figure 2:
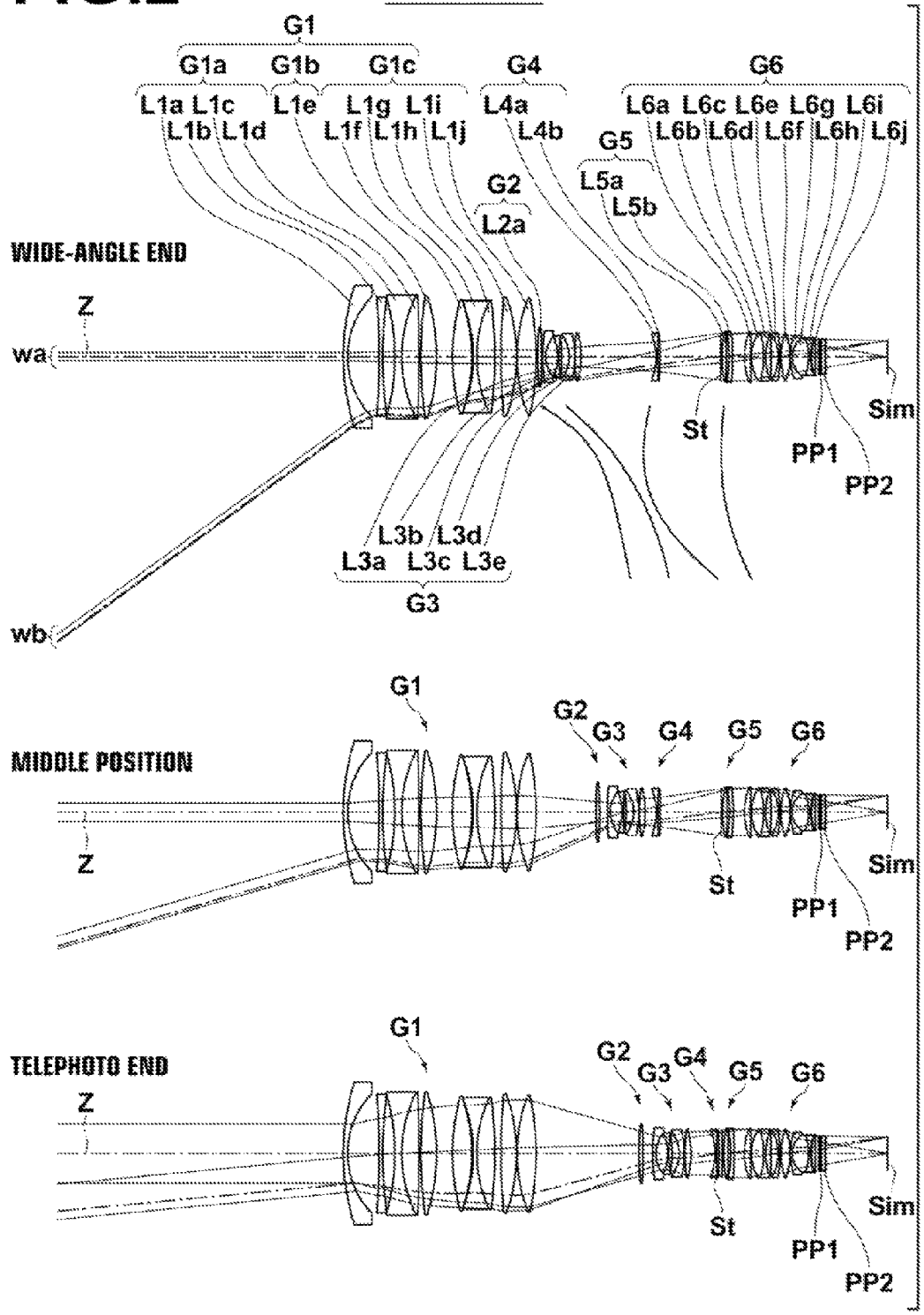
FIG. 2 is a sectional view illustrating the lens configuration of a zoom lens of Example 2 of the disclosure.
Figure 6:
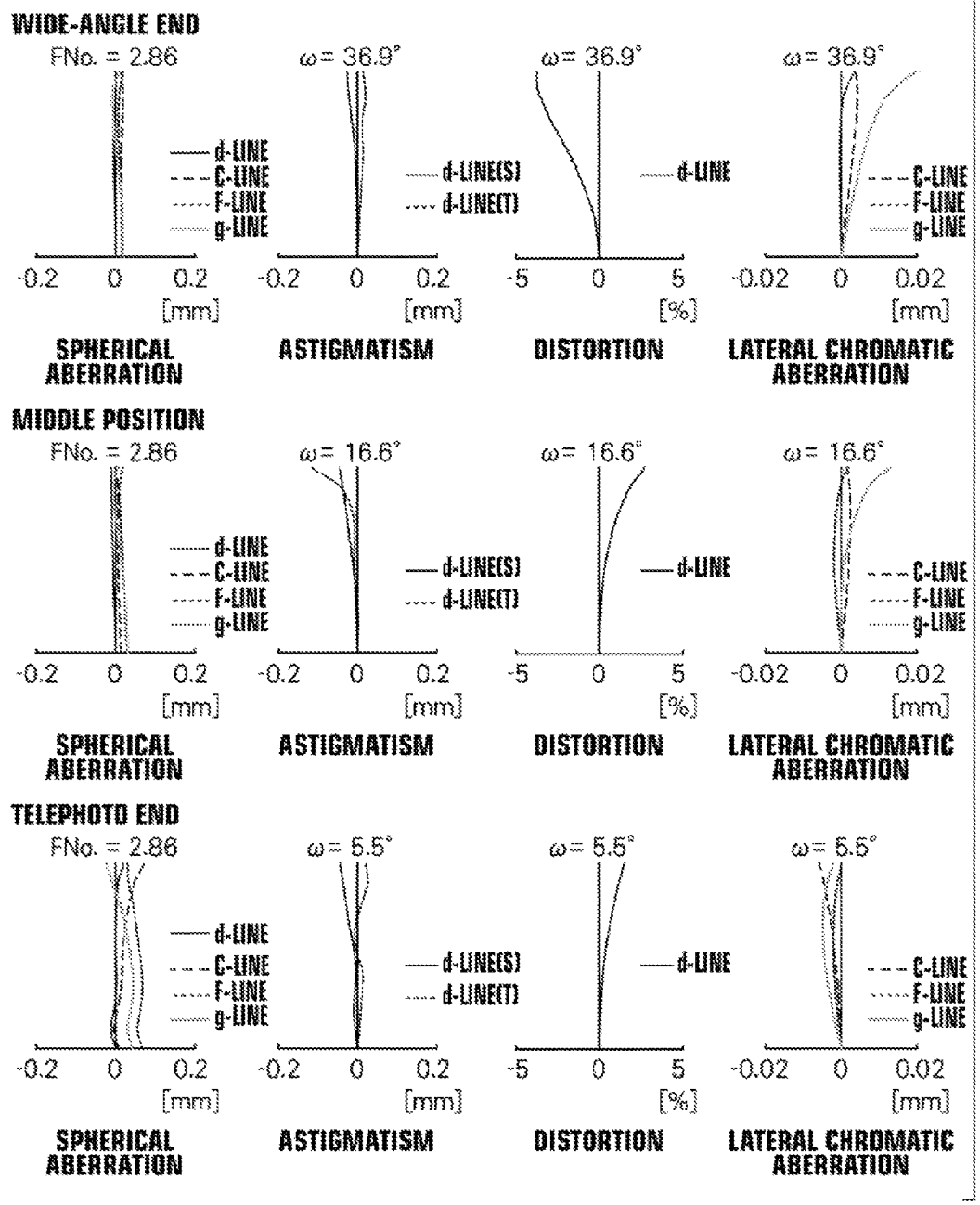
FIG. 6 shows aberration diagrams of the zoom lens of Example 2 of the disclosure.

Next, a zoom lens of Example 2 is described. FIG. 2 is a sectional view illustrating the lens configuration of the zoom lens of Example 2. The zoom lens of Example 2 consists of, in order from the object side, a first lens group G1 that has a positive refractive power and is fixed during magnification change, second to fifth lens groups G2 to G5 (movable lens groups) that are moved during magnification change with changing the distances along the optical axis direction between adjacent lens groups, and a sixth lens group G6 (end lens group) that has a positive refractive power, is disposed at the most image side, and is fixed during magnification change. The first lens group G1 consists of ten lenses L1a to L1j, the second lens group G2 consists of a lens L2a, the third lens group G3 consists of five lenses L3a to L3e, the fourth lens group G4 consists of two lenses L4a and L4b, the fifth lens group G5 consists of two lenses L5a and L5b, and the sixth lens group G6 consists of ten lenses L6a to L6j. Table 5 shows basic lens data of the zoom lens of Example 2, Table 6 shows data about specifications of the zoom lens, Table 7 shows data about variable surface distances of the zoom lens, Table 8 shows data about aspheric coefficients of the zoom lens, and FIG. 6 shows aberration diagrams of the zoom lens.

TABLE 5

Example 2 - Lens Data

| Surface No. | Radius of Curvature | Surface Distance | nd | vd | θgF |
|---|---|---|---|---|---|
| 1 | 204.5076 | 3.6001 | 1.88300 | 40.76 | 0.56679 |
| 2 | 75.1577 | 26.8271 |  |  |  |
| 3 | −680.1918 | 3.3001 | 1.73400 | 51.47 | 0.54874 |
| 4 | 394.2434 | 10.1996 |  |  |  |
| 5 | −194.8976 | 6.0275 | 1.53775 | 74.70 | 0.53936 |
| 6 | 119.9249 | 14.7493 | 1.91650 | 31.60 | 0.59117 |
| 7 | −1395.5679 | 1.4975 |  |  |  |
| *8 | 334.5227 | 13.5447 | 1.43875 | 94.94 | 0.53433 |
| 9 | −178.4244 | 13.8156 |  |  |  |
| 10 | 190.5673 | 16.5365 | 1.49700 | 81.54 | 0.53748 |
| 11 | −148.2904 | 0.8631 |  |  |  |
| 12 | −137.7176 | 3.3505 | 1.85150 | 40.78 | 0.56958 |
| 13 | 113.9140 | 15.3310 | 1.49700 | 81.54 | 0.53748 |
| 14 | −407.0823 | 5.3500 |  |  |  |
| 15 | 573.8699 | 13.3719 | 1.53775 | 74.70 | 0.53936 |
| 16 | −155.6554 | 0.2451 |  |  |  |
| 17 | 138.0910 | 16.3580 | 1.49700 | 81.54 | 0.53748 |
| 18 | −248.2025 | DD[18] |  |  |  |
| 19 | 331.9810 | 3.0337 | 1.49700 | 81.54 | 0.53748 |
| 20 | −566.9344 | DD[20] |  |  |  |
| *21 | 236.4764 | 2.3725 | 1.53775 | 74.70 | 0.53936 |
| 22 | 27.4357 | 10.1724 |  |  |  |
| 23 | −43.6440 | 1.2000 | 2.00100 | 29.13 | 0.59952 |
| 24 | 196.3935 | 2.3659 |  |  |  |
| 25 | −105.3852 | 6.3996 | 1.69895 | 30.13 | 0.60298 |
| 26 | −29.4777 | 4.4704 | 1.69560 | 59.05 | 0.54348 |
| 27 | −84.3847 | 0.3005 |  |  |  |
| 28 | 170.5472 | 5.1064 | 1.83481 | 42.72 | 0.56486 |
| 29 | −82.5546 | DD[29] |  |  |  |

TABLE 5-continued

Example 2 - Lens Data

| Surface No. | Radius of Curvature | Surface Distance | nd | vd | θgF |
|---|---|---|---|---|---|
| 30 | −52.8642 | 1.3101 | 1.49700 | 81.54 | 0.53748 |
| 31 | 1177.9980 | 1.9548 | 1.84666 | 23.83 | 0.61603 |
| 32 | −319.2827 | DD[32] | | | |
| 33 (stop) | ∞ | 1.1696 | | | |
| 34 | 117.8758 | 3.7936 | 1.91082 | 35.25 | 0.58224 |
| 35 | −345.2428 | 2.2403 | | | |
| 36 | −103.1702 | 3.0000 | 1.76182 | 26.52 | 0.61361 |
| 37 | −203.4153 | DD[37] | | | |
| 38 | 60.3391 | 5.2627 | 1.65844 | 50.88 | 0.55612 |
| 39 | ∞ | 0.8372 | | | |
| 40 | 41.6543 | 10.3088 | 1.43875 | 94.94 | 0.53433 |
| 41 | −77.6159 | 1.5892 | 1.95375 | 32.32 | 0.59015 |
| 42 | 55.9588 | 4.8039 | | | |
| 43 | −243.7036 | 6.2713 | 1.80518 | 25.43 | 0.61027 |
| 44 | −35.9951 | 1.4100 | 1.80400 | 46.58 | 0.55730 |
| 45 | −106.5175 | 0.6156 | | | |
| 46 | 63.7897 | 7.9106 | 1.48749 | 70.24 | 0.53007 |
| 47 | −63.7897 | 0.2007 | | | |
| 48 | 54.4770 | 1.6010 | 1.91082 | 35.25 | 0.58224 |
| 49 | 20.5144 | 14.2437 | 1.49700 | 81.54 | 0.53748 |
| 50 | −41.6177 | 1.6006 | 1.90043 | 37.37 | 0.57720 |
| 51 | 57.8925 | 0.3412 | | | |
| 52 | 48.5057 | 3.3350 | 1.84666 | 23.83 | 0.61603 |
| 53 | 242.4352 | 3.0000 | | | |
| 54 | ∞ | 1.4000 | 1.51633 | 64.14 | 0.53531 |
| 55 | ∞ | 1.0000 | | | |
| 56 | ∞ | 3.6900 | 1.51633 | 64.14 | 0.53531 |
| 57 | ∞ | 52.9818 | | | |

TABLE 6

Example 2 - Specifications (d-line)

| | Wide Angle End | Middle | Telephoto End |
|---|---|---|---|
| Zoom Magnification | 1.0 | 2.4 | 7.4 |
| f | 19.88 | 46.74 | 146.14 |
| FNo. | 2.86 | 2.86 | 2.86 |
| 2ω [°] | 73.8 | 33.2 | 11.0 |

TABLE 7

Example 2 - Distances with respect to Zoom

| | Wide Angle End | Middle | Telephoto End |
|---|---|---|---|
| DD [18] | 1.4998 | 51.1925 | 88.2200 |
| DD [20] | 1.4938 | 6.8434 | 8.7530 |
| DD [29] | 64.3039 | 9.6273 | 20.8055 |
| DD [32] | 51.9906 | 52.1819 | 2.9978 |
| DD [37] | 10.1220 | 9.5650 | 8.6338 |

TABLE 8

Example 2 - Aspheric Coefficients

| | Surface No. 8 |
|---|---|
| KA | 1.0000000E+00 |
| A3 | 1.5064530E−07 |
| A4 | −1.5641141E−07 |
| A5 | 1.6501598E−09 |
| A6 | −3.9701428E−11 |
| A7 | 6.9263338E−13 |
| A8 | 1.0556630E−17 |
| A9 | −7.0509369E−17 |

TABLE 8-continued

Example 2 - Aspheric Coefficients

| | Surface No. |
|---|---|
| A10 | 5.3287613E−19 |

| | Surface No. 21 |
|---|---|
| KA | 1.0000000E+00 |
| A4 | 1.5045420E−06 |
| A6 | −4.1679388E−10 |
| A8 | −8.9800509E−12 |
| A10 | 7.0993908E−14 |
| A12 | −3.2299521E−16 |
| A14 | 8.7823289E−19 |
| A16 | −1.4036759E−21 |
| A18 | 1.2097861E−24 |
| A20 | −4.3023907E−28 |

Figure 3:
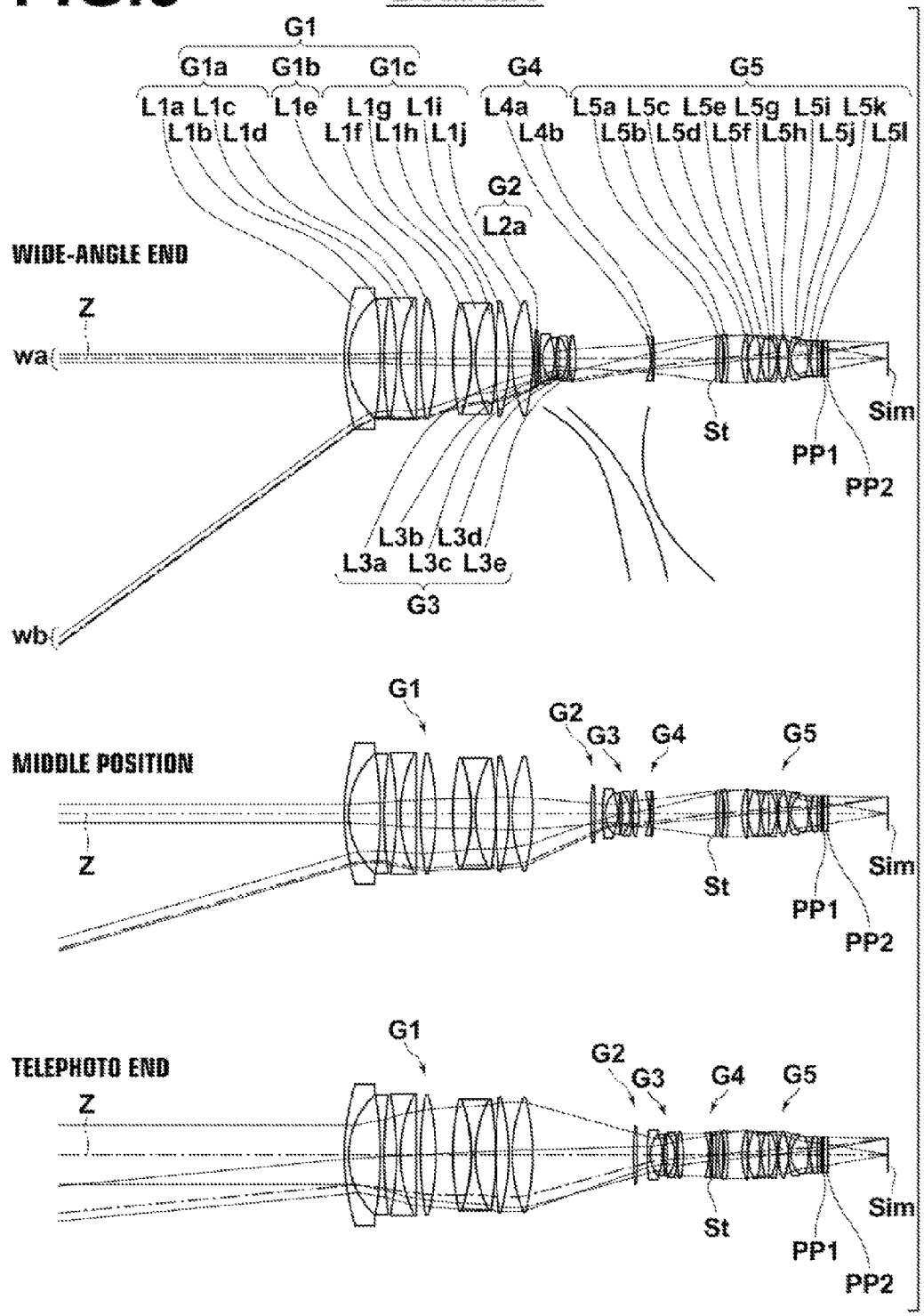
FIG. 3 is a sectional view illustrating the lens configuration of a zoom lens of Example 3 of the disclosure.

Next, a zoom lens of Example 3 is described. FIG. 3 is a sectional view illustrating the lens configuration of the zoom lens of Example 3. The zoom lens of Example 3 has the same lens group configuration as that of the zoom lens of Example 1. Table 9 shows basic lens data of the zoom lens of Example 3, Table 10 shows data about specifications of the zoom lens, Table 11 shows data about variable surface distances of the zoom lens, Table 12 shows data about aspheric coefficients of the zoom lens, and FIG. 7 shows aberration diagrams of the zoom lens.

TABLE 9

Example 3 - Lens Data

| Surface No. | Radius of Curvature | Surface Distance | nd | vd | θgF |
|---|---|---|---|---|---|
| 1 | 203.3033 | 3.6000 | 1.75500 | 52.32 | 0.54765 |
| 2 | 70.9391 | 27.1004 | | | |
| 3 | −338.7454 | 3.3001 | 1.77250 | 49.60 | 0.55212 |
| 4 | 378.5456 | 10.5278 | | | |
| 5 | −265.5030 | 3.5300 | 1.43875 | 94.66 | 0.53402 |
| 6 | 122.8648 | 13.6010 | 1.91082 | 35.25 | 0.58224 |
| 7 | −19851.3347 | 3.6816 | | | |
| *8 | 281.3047 | 12.9599 | 1.43875 | 94.94 | 0.53433 |
| 9 | −214.8359 | 14.8527 | | | |
| 10 | 238.5428 | 15.5435 | 1.49700 | 81.54 | 0.53748 |
| 11 | −142.9598 | 0.5234 | | | |
| 12 | −137.9389 | 3.3500 | 1.83481 | 42.72 | 0.56486 |
| 13 | 106.1360 | 17.0654 | 1.49700 | 81.54 | 0.53748 |
| 14 | −316.9974 | 0.4827 | | | |
| 15 | 543.8380 | 11.0182 | 1.53775 | 74.70 | 0.53936 |
| 16 | −177.9557 | 2.8866 | | | |
| 17 | 133.2953 | 17.4933 | 1.49700 | 81.54 | 0.53748 |
| 18 | −208.4111 | DD[18] | | | |
| 19 | 349.0362 | 3.0377 | 1.49700 | 81.54 | 0.53748 |
| 20 | −585.2849 | DD[20] | | | |
| *21 | 231.8394 | 2.3423 | 1.53775 | 74.70 | 0.53936 |
| 22 | 27.2866 | 10.6024 | | | |
| 23 | −43.2897 | 1.2000 | 2.00100 | 29.13 | 0.59952 |
| 24 | 203.7558 | 2.8071 | | | |
| 25 | −102.0549 | 6.6695 | 1.69895 | 30.13 | 0.60298 |
| 26 | −29.2108 | 1.7290 | 1.69560 | 59.05 | 0.54348 |
| 27 | −80.5930 | 0.3005 | | | |
| 28 | 161.3029 | 5.2395 | 1.83481 | 42.72 | 0.56486 |
| 29 | −80.8454 | DD[29] | | | |
| 30 | −52.3914 | 1.3100 | 1.49700 | 81.54 | 0.53748 |
| 31 | 3010.3139 | 1.9234 | 1.84666 | 23.83 | 0.61603 |
| 32 | −274.0259 | DD[32] | | | |
| 33 (stop) | ∞ | 2.0283 | | | |
| 34 | 119.4012 | 3.5996 | 1.91082 | 35.25 | 0.58224 |
| 35 | −414.6305 | 1.6311 | | | |
| 36 | −106.0887 | 3.0000 | 1.76182 | 26.52 | 0.61361 |
| 37 | −192.8743 | 11.6874 | | | |
| 38 | 62.8957 | 5.0727 | 1.65844 | 50.88 | 0.55612 |
| 39 | ∞ | 0.3004 | | | |

TABLE 9-continued

Example 3 - Lens Data

| Surface No. | Radius of Curvature | Surface Distance | nd | νd | θgF |
|---|---|---|---|---|---|
| 40 | 42.0886 | 10.3576 | 1.43875 | 94.94 | 0.53433 |
| 41 | −78.0793 | 1.4003 | 1.95375 | 32.32 | 0.59015 |
| 42 | 55.8551 | 6.2257 | | | |
| 43 | −253.7994 | 6.5210 | 1.80518 | 25.43 | 0.61027 |
| 44 | −36.2933 | 1.4100 | 1.80400 | 46.58 | 0.55730 |
| 45 | −105.8885 | 0.2000 | | | |
| 46 | 64.2148 | 8.2858 | 1.48749 | 70.24 | 0.53007 |
| 47 | −64.2148 | 0.2000 | | | |
| 48 | 55.2351 | 2.2417 | 1.91082 | 35.25 | 0.58224 |
| 49 | 20.9380 | 14.8846 | 1.49700 | 81.54 | 0.53748 |
| 50 | −43.1405 | 1.6000 | 1.90043 | 37.37 | 0.57720 |
| 51 | 58.6237 | 0.2008 | | | |
| 52 | 46.2659 | 5.8212 | 1.84666 | 23.83 | 0.61603 |
| 53 | 184.1153 | 3.0000 | | | |
| 54 | ∞ | 1.4000 | 1.51633 | 64.14 | 0.53531 |
| 55 | ∞ | 1.0000 | | | |
| 56 | ∞ | 3.6900 | 1.51633 | 64.14 | 0.53531 |
| 57 | ∞ | 51.2846 | | | |

TABLE 10

Example 3 - Specifications (d-line)

| | Wide Angle End | Middle | Telephoto End |
|---|---|---|---|
| Zoom Magnification | 1.0 | 2.4 | 7.4 |
| f | 19.90 | 46.79 | 146.29 |
| FNo. | 2.86 | 2.86 | 2.86 |
| 2ω [°] | 73.8 | 33.2 | 11.0 |

TABLE 11

Example 3 - Distances with respect to Zoom

| | Wide Angle End | Middle | Telephoto End |
|---|---|---|---|
| DD [18] | 1.4998 | 50.0802 | 86.4555 |
| DD [20] | 1.4969 | 6.8465 | 8.7561 |
| DD [29] | 64.0006 | 9.2167 | 21.7032 |
| DD [32] | 52.8723 | 53.7262 | 2.9548 |

TABLE 12

Example 3 - Aspheric Coefficients

| Surface No. 8 | |
|---|---|
| KA | 1.0000000E+00 |
| A3 | 1.5064530E−07 |
| A4 | −1.5641141E−07 |
| A5 | 1.6501598E−09 |
| A6 | −3.9701428E−11 |
| A7 | 6.9263338E−13 |
| A8 | 1.0556630E−17 |
| A9 | −7.0509369E−17 |
| A10 | 5.3287613E−19 |

| Surface No. 21 | |
|---|---|
| KA | 1.0000000E+00 |
| A4 | 1.5045420E−06 |
| A6 | −4.1679388E−10 |
| A8 | −8.9800509E−12 |
| A10 | 7.0993908E−14 |
| A12 | −3.2299521E−16 |
| A14 | 8.7823289E−19 |

TABLE 12-continued

Example 3 - Aspheric Coefficients

| A16 | −1.4036759E−21 |
|---|---|
| A18 | 1.2097861E−24 |
| A20 | −4.3023907E−28 |

Figure 4:
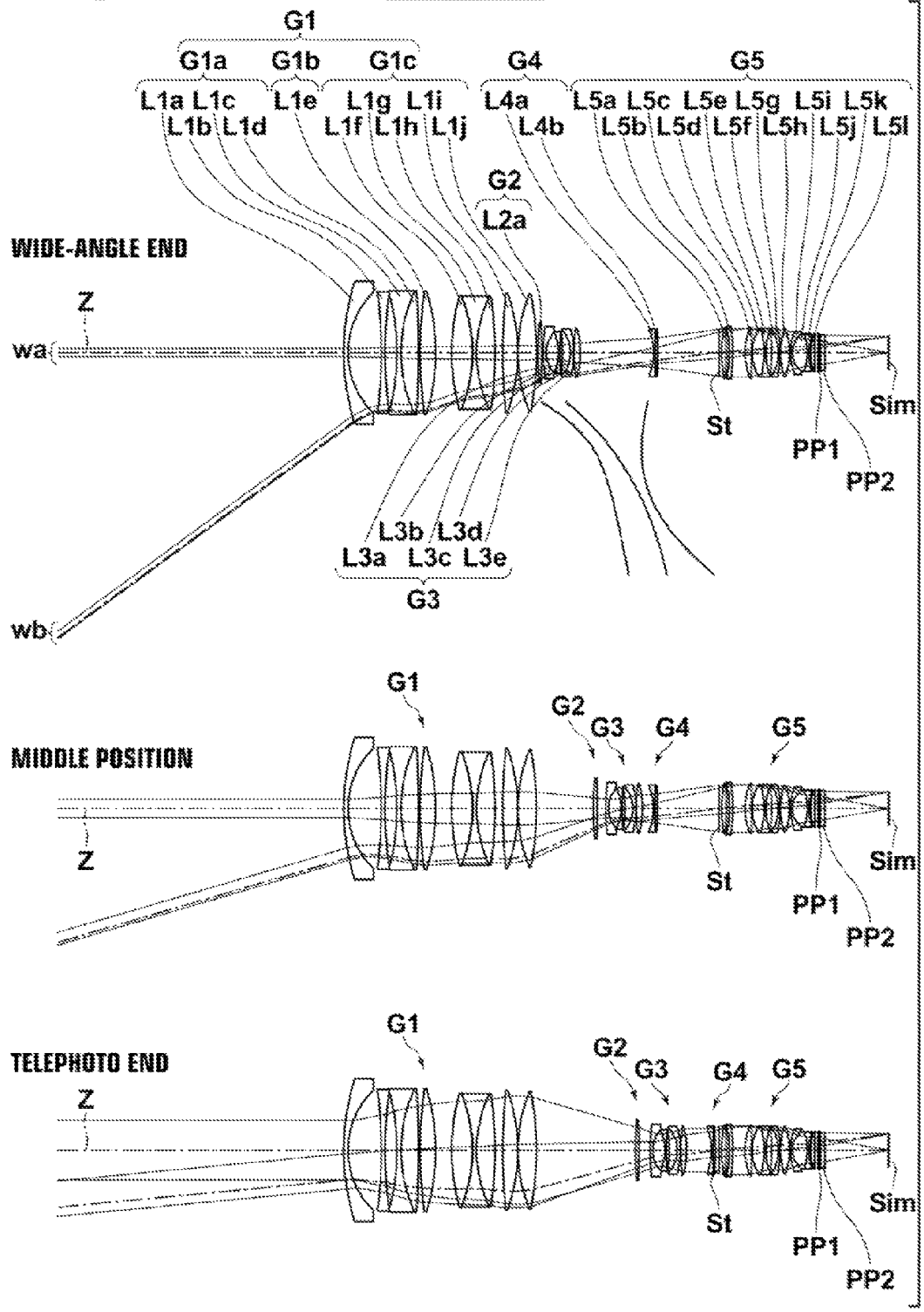
FIG. 4 is a sectional view illustrating the lens configuration of a zoom lens of Example 4 of the disclosure.
Figure 8:
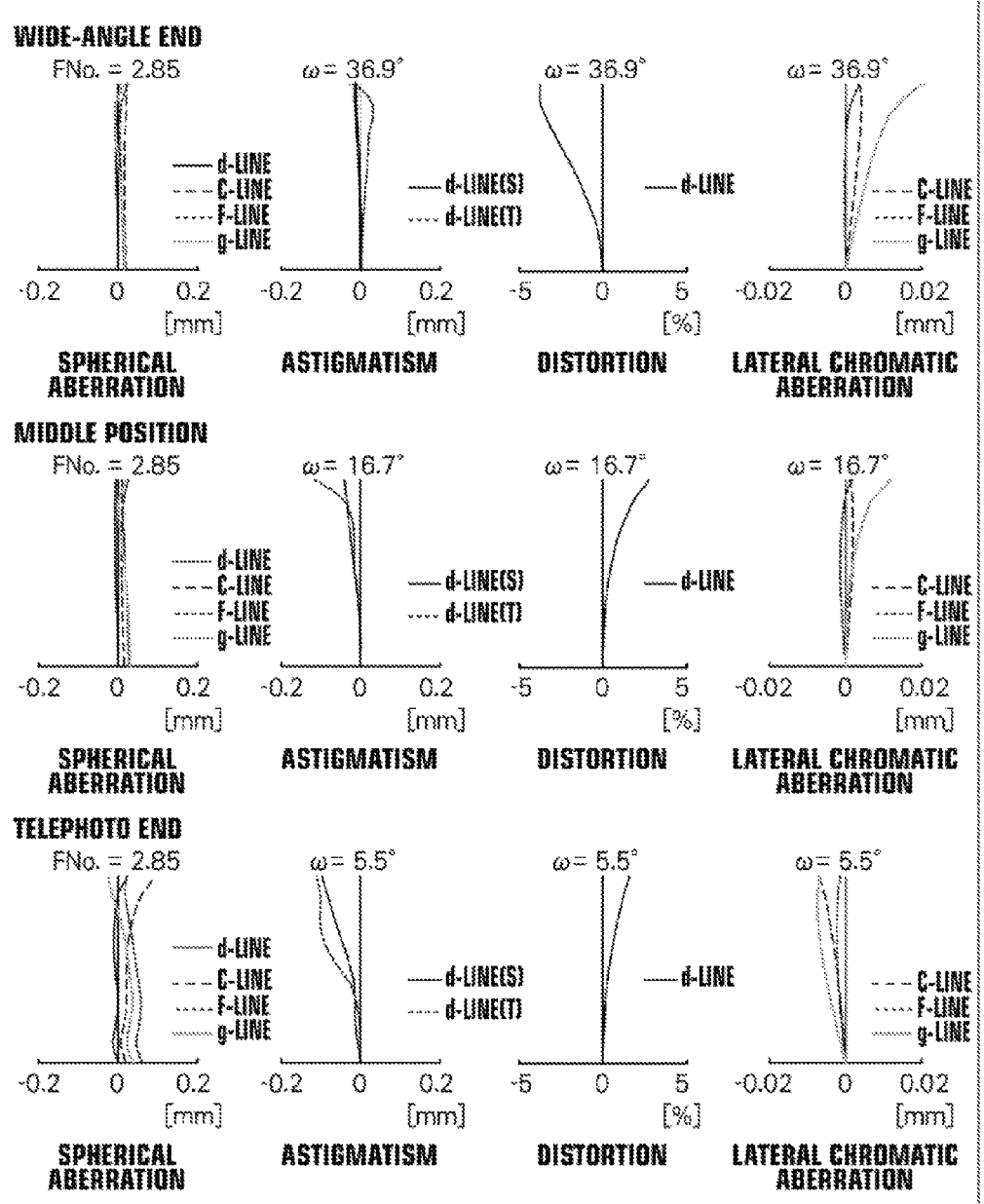
FIG. 8 shows aberration diagrams of the zoom lens of Example 4 of the disclosure.

Next, a zoom lens of Example 4 is described. FIG. 4 is a sectional view illustrating the lens configuration of the zoom lens of Example 4. The zoom lens of Example 4 has the same lens group configuration as that of the zoom lens of Example 1. Table 13 shows basic lens data of the zoom lens of Example 4, Table 14 shows data about specifications of the zoom lens, Table 15 shows data about variable surface distances of the zoom lens, Table 16 shows data about aspheric coefficients of the zoom lens, and FIG. 8 shows aberration diagrams of the zoom lens.

TABLE 13

Example 4 - Lens Data

| Surface No. | Radius of Curvature | Surface Distance | nd | νd | θgF |
|---|---|---|---|---|---|
| 1 | 206.2478 | 3.6000 | 1.83481 | 42.72 | 0.56486 |
| 2 | 73.6755 | 28.3630 | | | |
| 3 | −414.1587 | 3.3001 | 1.80400 | 46.58 | 0.55730 |
| 4 | 378.1742 | 10.0697 | | | |
| 5 | −203.7117 | 3.5307 | 1.49700 | 81.54 | 0.53748 |
| 6 | 126.7830 | 14.8567 | 1.91650 | 31.60 | 0.59117 |
| 7 | −800.5290 | 1.4943 | | | |
| *8 | 333.3336 | 13.3218 | 1.43875 | 94.94 | 0.53433 |
| 9 | −183.4719 | 14.0204 | | | |
| 10 | 199.5391 | 17.3922 | 1.49700 | 81.54 | 0.53748 |
| 11 | −131.2369 | 0.3242 | | | |
| 12 | −128.6939 | 3.3505 | 1.85150 | 40.78 | 0.56958 |
| 13 | 115.0910 | 15.6314 | 1.49700 | 81.54 | 0.53748 |
| 14 | −355.9889 | 6.5632 | | | |
| 15 | 459.3712 | 12.9818 | 1.53775 | 74.70 | 0.53936 |
| 16 | −156.5869 | 0.2014 | | | |
| 17 | 137.0094 | 15.6708 | 1.49700 | 81.54 | 0.53748 |
| 18 | −277.4188 | DD[18] | | | |
| 19 | 360.3858 | 3.0389 | 1.49700 | 81.54 | 0.53748 |
| 20 | −557.9596 | DD[20] | | | |
| *21 | 216.3200 | 2.4009 | 1.53775 | 74.70 | 0.53936 |
| 22 | 27.2953 | 10.4367 | | | |
| 23 | −42.9945 | 1.2000 | 2.00100 | 29.13 | 0.59952 |
| 24 | 192.1280 | 2.4232 | | | |
| 25 | −105.2604 | 6.7166 | 1.69895 | 30.13 | 0.60298 |
| 26 | −28.8310 | 2.6322 | 1.69560 | 59.05 | 0.54348 |
| 27 | −82.9675 | 0.3000 | | | |
| 28 | 162.6223 | 5.2344 | 1.83481 | 42.72 | 0.56486 |
| 29 | −80.5636 | DD[29] | | | |
| 30 | −51.8139 | 1.3100 | 1.49700 | 81.54 | 0.53748 |
| 31 | 1155.8690 | 1.9895 | 1.84666 | 23.83 | 0.61603 |
| 32 | −303.9788 | DD[32] | | | |
| 33 (stop) | ∞ | 2.5109 | | | |
| 34 | 118.6003 | 3.8001 | 1.91082 | 35.25 | 0.58224 |
| 35 | −340.2735 | 2.5000 | | | |
| 36 | −105.2797 | 3.0000 | 1.76182 | 26.52 | 0.61361 |
| 37 | −211.7385 | 10.7447 | | | |
| 38 | 59.6286 | 5.2859 | 1.65844 | 50.88 | 0.55612 |
| 39 | ∞ | 0.7143 | | | |
| 40 | 42.1381 | 10.1467 | 1.43875 | 94.94 | 0.53433 |
| 41 | −79.4704 | 1.4000 | 1.95375 | 32.32 | 0.59015 |
| 42 | 57.3111 | 4.8082 | | | |
| 43 | −211.6643 | 5.9778 | 1.80518 | 25.43 | 0.61027 |
| 44 | −36.7566 | 1.4100 | 1.80400 | 46.58 | 0.55730 |
| 45 | −107.9111 | 0.2974 | | | |
| 46 | 65.4459 | 7.6951 | 1.48749 | 70.24 | 0.53007 |
| 47 | −65.4459 | 0.9133 | | | |
| 48 | 52.8061 | 1.6002 | 1.91082 | 35.25 | 0.58224 |
| 49 | 20.4963 | 12.8564 | 1.49700 | 81.54 | 0.53748 |
| 50 | −42.9103 | 1.6003 | 1.90043 | 37.37 | 0.57720 |
| 51 | 57.8695 | 1.1479 | | | |

TABLE 13-continued

Example 4 - Lens Data

| Surface No. | Radius of Curvature | Surface Distance | nd | vd | θgF |
|---|---|---|---|---|---|
| 52 | 49.7950 | 3.2238 | 1.84666 | 23.83 | 0.61603 |
| 53 | 250.6338 | 3.0000 | | | |
| 54 | ∞ | 1.4000 | 1.51633 | 64.14 | 0.53531 |
| 55 | ∞ | 1.0000 | | | |
| 56 | ∞ | 3.6900 | 1.51633 | 64.14 | 0.53531 |
| 57 | ∞ | 54.3476 | | | |

TABLE 14

Example 4 - Specifications (d-line)

| | Wide Angle End | Middle | Telephoto End |
|---|---|---|---|
| Zoom Magnification | 1.0 | 2.4 | 7.4 |
| f | 19.85 | 46.66 | 145.88 |
| FNo. | 2.85 | 2.85 | 2.85 |
| 2ω [°] | 73.8 | 33.4 | 11.0 |

TABLE 15

Example 4 - Distances with respect to Zoom

| | Wide Angle End | Middle | Telephoto End |
|---|---|---|---|
| DD [18] | 1.4999 | 48.9126 | 84.7378 |
| DD [20] | 1.6030 | 7.3950 | 9.3351 |
| DD [29] | 62.7958 | 9.3474 | 21.1948 |
| DD [32] | 52.3243 | 52.5680 | 2.9554 |

TABLE 16

Example 4 - Aspheric Coefficients

| | Surface No. 8 |
|---|---|
| KA | 1.0000000E+00 |
| A3 | 1.5064530E−07 |
| A4 | −1.5641141E−07 |
| A5 | 1.6501598E−09 |
| A6 | −3.9701428E−11 |
| A7 | 6.9263338E−13 |
| A8 | 1.0556630E−17 |
| A9 | −7.0509369E−17 |
| A10 | 5.3287613E−19 |

| | Surface No. 21 |
|---|---|
| KA | 1.0000000E+00 |
| A4 | 1.5045420E−06 |
| A6 | −4.1679388E−10 |
| A8 | −8.9800509E−12 |
| A10 | 7.0993908E−14 |
| A12 | −3.2299521E−16 |
| A14 | 8.7823289E−19 |
| A16 | −1.4036759E−21 |
| A18 | 1.2097861E−24 |
| A20 | −4.3023907E−28 |

Table 17 shows values corresponding to the condition expressions (1) to (7) of the zoom lenses of Examples 1 to 4. In all the examples, the d-line is used as a reference wavelength, and the values shown in the Table 17 below are with respect to the reference wavelength.

TABLE 17

| No. | Condition Expression | Example 1 | Example 2 | Example 3 | Example 4 |
|---|---|---|---|---|---|
| (1) | 62 < vdn | 74.70 | 74.70 | 94.66 | 81.54 |
| (2) | 0.64 < θgFn + 0.001625 × vdn < 0.7 | 0.66075 | 0.66075 | 0.68784 | 0.66999 |
| (3) | vdp < 40 | 31.60 | 31.60 | 35.25 | 31.60 |
| (4) | 0.62 < θgFp + 0.001625 × vdp < 0.67 | 0.64253 | 0.64253 | 0.63953 | 0.64253 |
| (5) | 1 < f1n/f1a < 2 | 1.273 | 1.262 | 1.696 | 1.433 |
| (6) | 1.2 < ft/f1 < 2 | 1.592 | 1.543 | 1.537 | 1.585 |
| (7) | fw/fp < 0.15 | 0.045 | 0.047 | 0.045 | 0.045 |

As can be seen from the above-described data, all the zoom lenses of Examples 1 to 4 satisfy the condition expressions (1) to (7), and are compact and high performance zoom lenses with successfully corrected chromatic aberration, while ensuring a zoom ratio of around 7×.

Figure 9:
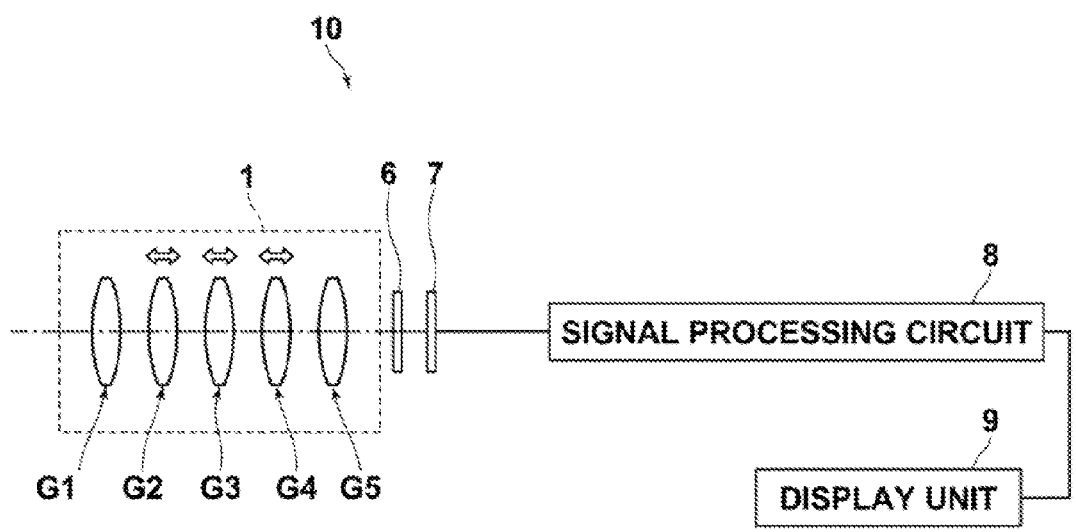
FIG. 9 is a diagram illustrating the schematic configuration of an imaging apparatus according to an embodiment of the disclosure.

Next, an imaging apparatus according to an embodiment of the disclosure is described. FIG. 9 is a diagram illustrating the schematic configuration of an imaging apparatus employing the zoom lens of the embodiment of the disclosure, which is one example of the imaging apparatus of the embodiment of the disclosure. It should be noted that the lens groups are schematically shown in FIG. 9. Examples of the imaging apparatus may include a video camera, an electronic still camera, etc., which include a solid-state image sensor, such as a CCD (Charge Coupled Device) or CMOS (Complementary Metal Oxide Semiconductor), serving as a recording medium.

The imaging apparatus 10 shown in FIG. 9 includes: a zoom lens 1; a filter 6 having a function of a low-pass filter, etc., disposed on the image plane side of the zoom lens 1; an image sensor 7 disposed on the image plane side of the filter 6; and a signal processing circuit 8. The image sensor 7 converts an optical image formed by the zoom lens 1 into an electric signal. As the image sensor 7, a CCD or a CMOS, for example, may be used. The image sensor 7 is disposed such that the imaging surface thereof is positioned in the same position as the image plane of the zoom lens 1.

An image taken through the zoom lens 1 is formed on the imaging surface of the image sensor 7. Then, a signal about the image outputted from the image sensor 7 is processed by the signal processing circuit 8, and the image is displayed on a display unit 9.

The imaging apparatus 10 of this embodiment is provided with the zoom lens 1 of the disclosure, and therefore allows size reduction of the apparatus, and obtaining high image-quality images.

The present disclosure has been described with reference to the embodiments and the examples. However, the disclosure is not limited to the above-described embodiments and examples, and various modifications may be made to the disclosure. For example, the values of the radius of curvature, the surface distance, the refractive index, the Abbe number, etc., of each lens element are not limited to the values shown in the above-described numerical examples and may be different values.

What is claimed is:

1. A zoom lens consists of, in order from the object side, a first lens group that has a positive refractive power and is fixed during magnification change, at least three movable lens groups that are moved during magnification change with changing the distances along the optical axis direction between adjacent lens groups, and an end lens group that has a positive refractive power, is disposed at the most image side, and is fixed during magnification change, wherein the at least three movable lens groups include, in order from the object side, a lens group having a positive refractive power, a lens group having a negative refractive power, and a lens group having a negative refractive power, the first lens group includes at least two negative lenses, wherein the most object-side negative lens has a meniscus shape with the convex surface toward the object side, and a first-n lens, which is at least one negative lens of the rest of the negative lenses of the first lens group, satisfies the condition expressions (1) and (2) below:

$$62<vdn \qquad (1), \text{ and}$$

$$0.64<\theta gFn+0.001625\times vdn<0.7 \qquad (2),$$

where vdn is an Abbe number with respect to the d-line of the first-n lens, and θgFn is a partial dispersion ratio of the first-n lens.

2. The zoom lens as claimed in claim 1, wherein the first lens group includes a cemented lens formed by, in order from the object side, the first-n lens and a first-p lens having a positive refractive power that are cemented together, and satisfies the condition expressions (3) and (4) below:

$$vdp<40 \qquad (3), \text{ and}$$

$$0.62<\theta gFp+0.001625\times vdp<0.67 \qquad (4),$$

where vdp is an Abbe number with respect to the d-line of the first-p lens, and θgFp is a partial dispersion ratio of the first-p lens.

3. The zoom lens as claimed in claim 2, wherein the condition expression (3-1) below is satisfied:

$$20<vdp<38 \qquad (3-1).$$

4. The zoom lens as claimed in claim 2, wherein the condition expression (4-1) below is satisfied:

$$0.63<\theta gFp+0.001625\times vdp<0.66 \qquad (4-1).$$

5. The zoom lens as claimed in claim 1, wherein the first lens group consists of, in order from the object side, a first-a lens group that has a negative refractive power and is fixed during focusing, a first-b lens group that has a positive refractive power and is moved during focusing with changing the distances along the optical axis direction between adjacent groups, and a first-c lens group that has a positive refractive power, and the first-n lens is included in the first-a lens group.

6. The zoom lens as claimed in claim 5, wherein the condition expression (5) below is satisfied:

$$1<fln/fla<2 \qquad (5),$$

where fln is a focal length with respect to the d-line of the first-n lens, and fla is a focal length with respect to the d-line of the first-a lens group.

7. The zoom lens as claimed in claim 6, wherein the condition expression (5-1) below is satisfied:

$$1.1<fln/fla<1.8 \qquad (5-1).$$

8. The zoom lens as claimed in claim 5, wherein the first-a lens group consists of, in order from the object side, two negative lenses, and a cemented lens formed by, in order from the object side, the first-n lens and a first-p lens having a positive refractive power that are cemented together.

9. The zoom lens as claimed in claim 5, wherein the first-c lens group is fixed during focusing.

10. The zoom lens as claimed in claim 5, wherein the first-c lens group is moved during focusing along a different locus of movement from that of the first-b lens group.

11. The zoom lens as claimed in claim 1, wherein the condition expression (6) below is satisfied:

$$1.2<ft/fl<2 \qquad (6),$$

where ft is a focal length of the entire system at the telephoto end, and fl is a focal length of the first lens group.

12. The zoom lens as claimed in claim 11, wherein the condition expression (6-1) below is satisfied:

$$1.3<ft/fl<1.8 \qquad (6-1).$$

13. The zoom lens as claimed in claim 1, wherein the condition expression (7) below is satisfied:

$$fw/fp<0.15 \qquad (7),$$

where fw is a focal length of the entire system at the wide angle end, and fp is a focal length of the most object-side movable lens group having a positive refractive power of the movable lens groups.

14. The zoom lens as claimed in claim 13, wherein the condition expression (7-1) below is satisfied:

$$0.02<fw/fp<0.1 \qquad (7-1).$$

15. The zoom lens as claimed in claim 1, wherein the at least three movable lens groups consists of, in order from the object side, a second lens group having a positive refractive power, a third lens group having a negative refractive power, and a fourth lens group having a negative refractive power.

16. The zoom lens as claimed in claim 1, wherein the at least three movable lens groups consists of, in order from the object side, a second lens group having a positive refractive power, a third lens group having a negative refractive power, a fourth lens group having a negative refractive power, and a fifth lens group having a positive refractive power.

17. The zoom lens as claimed in claim 1, wherein the condition expression (1-1) below is satisfied:

$$70<vdn \qquad (1-1).$$

18. The zoom lens as claimed in claim 17, wherein the condition expression (1-2) below is satisfied:

$$70<vdn<100 \qquad (1-2).$$

19. The zoom lens as claimed in claim 1 wherein the condition expression (2-1) below is satisfied:

$$0.65<\theta gFn+0.001625\times vdn<0.69 \qquad (2-1).$$

20. An imaging apparatus comprising the zoom lens as claimed in claim 1.

* * * * *